United States Patent [19]

Frutiger

[11] 4,079,195

[45] Mar. 14, 1978

[54] METHOD AND APPARATUS FOR THE SYNCHRONIZATION OF A DECIPHERING DEVICE FUNCTIONING AS A RECEIVER WITH AN ENCIPHERING DEVICE FUNCTIONING AS TRANSMITTER

[75] Inventor: Peter Frutiger, Wangen, Switzerland

[73] Assignee: Anstalt Europaische Handelsgesellschaft, Vaduz, Liechtenstein

[21] Appl. No.: 652,758

[22] Filed: Jan. 27, 1976

[30] Foreign Application Priority Data

Feb. 5, 1975  Switzerland .......................... 1366/75

[51] Int. Cl.² .......................... H04L 7/04; H04L 9/00; H04K 1/00
[52] U.S. Cl. .................................... 178/22; 178/69.1; 179/1.5 R; 179/15 BS
[58] Field of Search ...................... 178/22, 69.5 R, 22, 178/69.1; 179/1.5 R, 15 BS

[56] References Cited

U.S. PATENT DOCUMENTS

| | | | |
|---|---|---|---|
| 3,597,539 | 8/1971 | Clark | 179/15 BS |
| 3,639,838 | 2/1972 | Kuhn et al. | 179/15 BS |
| 3,740,478 | 6/1973 | Breant et al. | 178/69.5 R |
| 3,823,266 | 7/1974 | Van Elk et al. | 178/69.5 R |
| 3,936,601 | 2/1976 | Obeginski | 178/22 |
| 3,969,582 | 7/1976 | van Duuren et al. | 178/69.5 R |

*Primary Examiner*—Howard A. Birmiel
*Attorney, Agent, or Firm*—Ostrolenk, Faber, Gerb & Soffen

[57] ABSTRACT

A method of, and apparatus for, the synchronization of a deciphering device operating as a receiver with an enciphering device operating as a transmitter, wherein at the transmitter end between information pulse series at a fixed spacing from one another there are inserted a given number of auxiliary pulses similar to the information pulses. Each inserted auxiliary pulse series is produced from the previously inserted auxiliary pulse series in accordance with a predetermined formation principle. At the receiver end the pulse series transmitted by the transmitter is stored in a storage and the stored pulses compared with comparison pulse series in order to determine coincidence of the stored auxiliary pulser series with the comparison pulse series. The comparison pulse series possess the same number of pulses and are formed according to the same formation principle as the auxiliary pulse series. After determination of coincidence of the comparison pulse series with the stored auxiliary pulse series the latter are separated from the stored information pulse series.

7 Claims, 7 Drawing Figures

Fig. 3
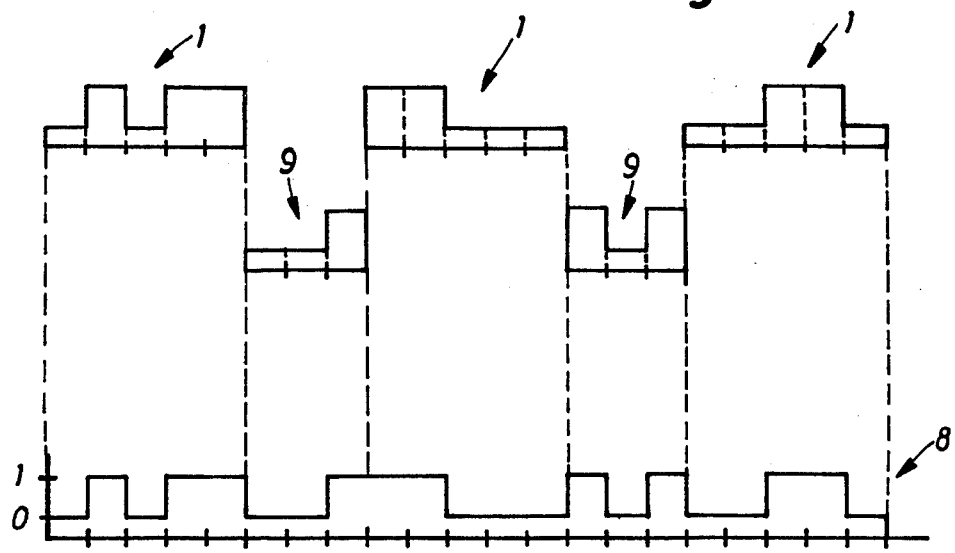
Fig. 4
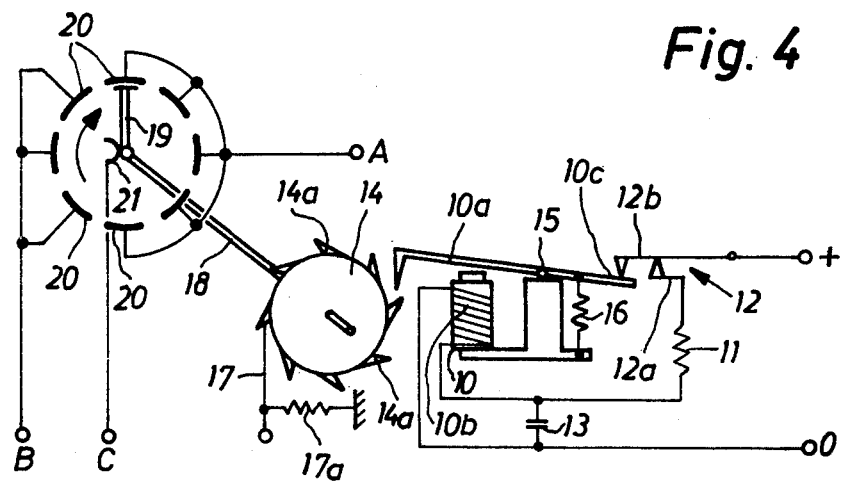
Fig. 7
| VII | VI  | V   | IV  | III | II  | I   |
|-----|-----|-----|-----|-----|-----|-----|
| BBA | BAB | ABA | BAA | AAA | AAB | ABB |
| BAB | ABA | BAA | AAA | AAB | ABB | BBA |
| ABA | BAA | AAA | AAB | ABB | BBA | BAB |
| BAA | AAA | AAB | ABB | BBA | BAB | ABA |

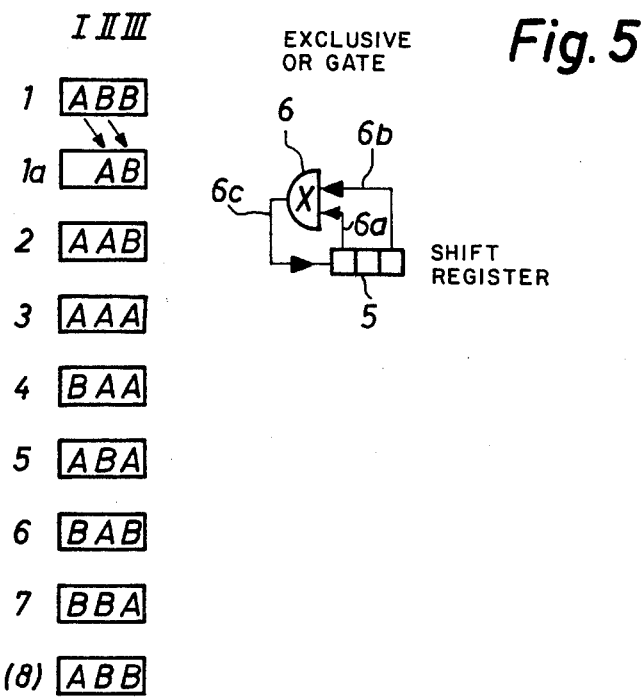
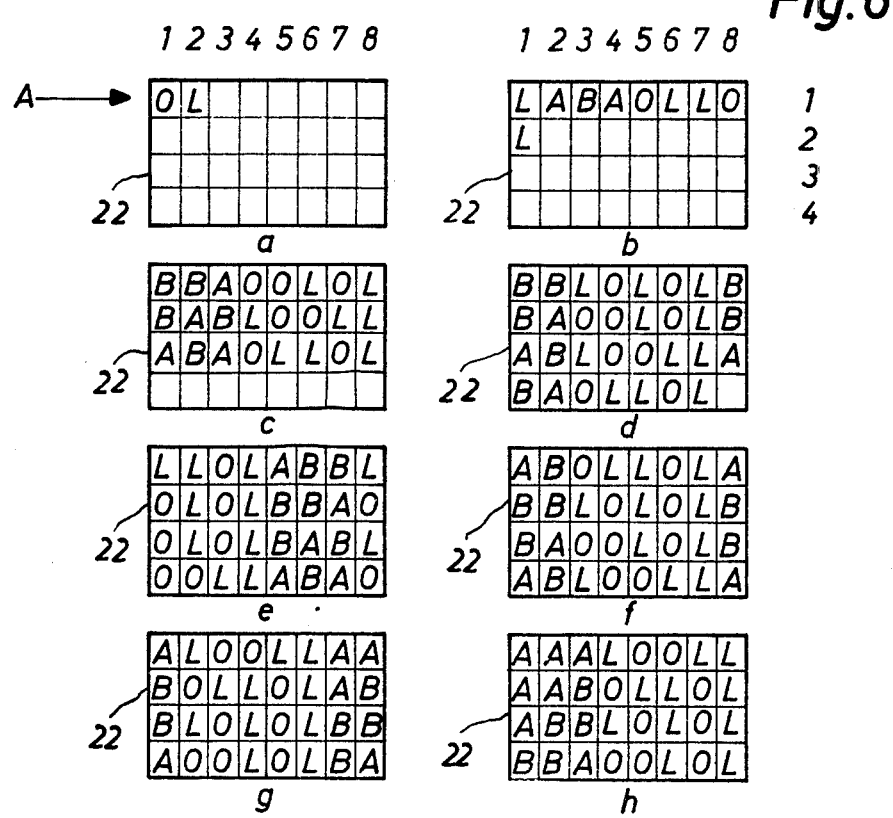

METHOD AND APPARATUS FOR THE SYNCHRONIZATION OF A DECIPHERING DEVICE FUNCTIONING AS A RECEIVER WITH AN ENCIPHERING DEVICE FUNCTIONING AS TRANSMITTER

BACKGROUND OF THE INVENTION

The present invention relates to a new and improved method of synchronizing a deciphering device operating as a receiver with an enciphering device operating as a transmitter, and furthermore, the present invention relates to apparatus for the performance of the aforesaid method.

Enciphering and deciphering devices which cooperate in a digital network as transmitter and receiver, respectively, are conventionally equipped with Key pulse Generators which, as a general rule are stepped forward for each character pulse to be enciphered and deciphered respectively. Consequently, synchronism of the receiver end Key Generator, required for proper deciphering, with the Key Generator at the transmitter end is ensured. Of course, there is presupposed that at the start of the transmission of the message the Key Generators at the transmitter end and receiver end have the same starting position.

As an example there will be discussed hereinafter a presently employed technique for synchronizing the Key Generators at the receiver station and transmitter station. As a general rule the Key Generators are programmed with a secret base information, the Basic Key, which is valid for a certain period of time for all devices hooked up to the network. Starting from this base information there is determined for each transmitted message a certain starting information, commonly called the Message Key. The starting information need not of necessity be secret, provided that knowledge thereof without the base information is useless to an unauthorized individual. In practice such Message Key information is placed ahead of the actual message. By means of this MK receiver end device is brought into the same starting position as the transmitter end device.

The synchronization of the Key Generators at the transmitter end and receiver end at the start of the transmission of a message or text is especially problematic in the case of meshed or interconnected networks where messages of high information content or density are transmitted in various directions always between different stations. If, for instance, station A has transmitted a message during a predetermined time duration T to station B, then, as explained above, the Key Generators of these stations A and B are advanced through a number of steps corresponding to the length of the transmitted message. Now if station A or station B is supposed to transmit a message to station C which was not operational during the aforementioned time duration T, then, first of all the Key Generator of such station C must be synchronized with the Key Generator of station A or station B, as the case may be. This synchronization or placing in step of the Key Generators with one another must occur very rapidly.

SUMMARY OF THE INVENTION

With the foregoing in mind it is a primary object of the present invention to satisfy the foregoing requirements which exist with respect to synchronization of the transmitter end and receiver end Key Generators.

Another and more specific object of the present invention aims at the provision of a new and improved method of, and apparatus for, synchronizing a deciphering device working as a receiver with an enciphering device working as a transmitter and allowing placing in step or synchronization of the transmitter end and receiver end Key Generators at the start of message transmission and, when necessary, also during message transmission.

Now in order to implement these and still further objects of the invention, which will become more readily apparent as the description proceeds, the method aspects of this development contemplate introducing at the transmitter end between information pulse series of a fixed spacing always a given number of auxiliary pulses similar to the information pulses, each introduced auxiliary pulse series is produced according to a given formation principle from the preceding introduced auxiliary pulse series. Further, at the receiver end the pulse series transmitted by the transmitter are stored in a buffer memory, the stored pulses compared with comparison pulse series in order to determine the coincidence of the stored auxiliary pulse series with the comparison pulse series. The comparison pulse series possess the same number of pulses and are formed according to the same formation principle as the auxiliary pulse series. Moreover, after determination of coincidence of the comparison pulse series with the stored auxiliary pulse series the latter are separated from the stored information pulse series.

The invention not only concerns the aforementioned method aspects but also relates to apparatus for the performance thereof and is manifested by the features that at the transmitter end there is present a switching device at the first input of which there appear the information pulses and the second input of which is connected with an auxiliary pulse generator. The output of the switching device can be connected during a fixed first number of clock steps with the first input and during a fixed second number of clock steps with the second input. At the receiver end there are present a buffer memory and a comparison pulse generator which is coupled with a comparison stage which compares the pulses stored in the buffer memory with the comparison pulse series produced by the comparison pulse generator and which after determination of the coincidence of the stored auxiliary pulse series with the comparison pulse series acts upon a circuit for separating the pulses the information pulses from one another.

BRIEF DESCRIPTION OF THE DRAWINGS

The invention will be better understood and objects other than those set forth above, will become apparent when consideration is given to the following detailed description thereof.

FIG. 3 schematically illustrates the pulse train formed by means of the circuit of FIG. 1;

FIG. 4 schematically illustrates a component of the circuitry of FIG. 1;

FIG. 5 illustrates a reinjected shift register constituting a component of the circuitry of FIGS. 1 and 2;

FIG. 6 schematically illustrates the buffer memory of the circuit according to FIG. 2; and FIG. 7 illustrates the pulse train in columns and lines produced by the shift register of FIG. 5.

DETAILED DESCRIPTION OF THE PREFERRED EMBODIMENTS

Figure 1:
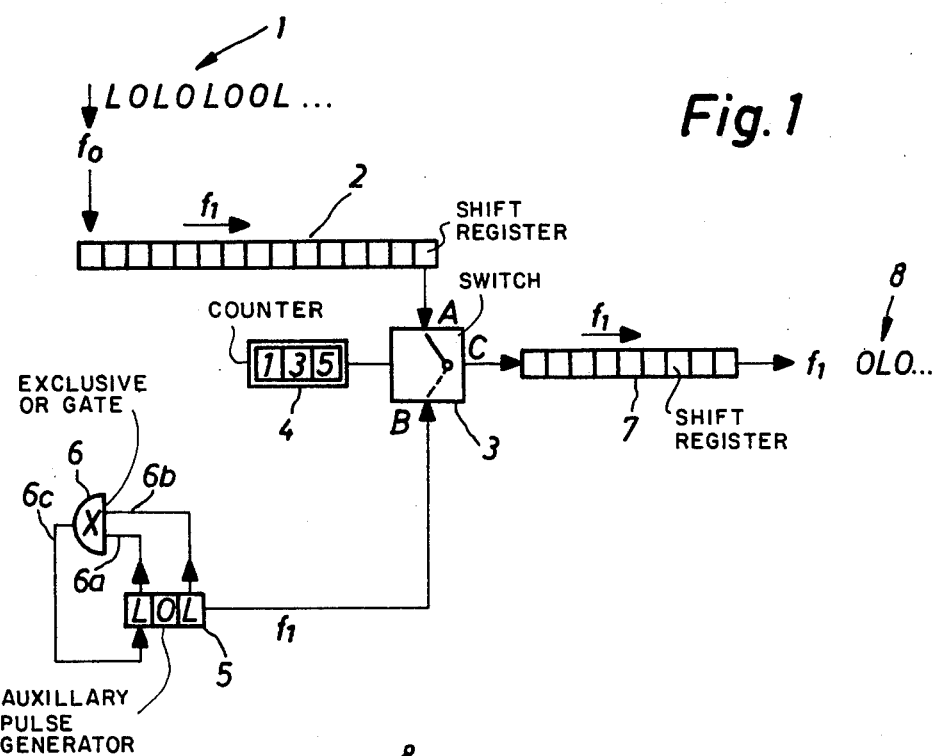
FIG. 1 is a block diagram of circuitry at the transmitter end.

Describing now the drawings it is to be understood that only enough of the enciphering and deciphering devices have been shown to enable those skilled in the art to readily understand the underlying concepts and principles of the invention. Thus, as a matter of convenience in illustration there have been omitted from the drawings the conventional components required for enciphering and deciphering, such as for instance Key generators, mixing stages and clock generators.

The clock generators of the transmitting station and receiving station operate synchronously with the aid of a non-illustrated conventional clock synchronization device so that the reference clock speed in the transmitting device and receiving device can be considered to be the same.

For the following explanations there is used for characterizing the letters and numbers to be transmitted the CCITT-telegraph code No. 2. However, it is of course possible to use another suitable code.

In accordance with this code No. 2 a character (letter or number) is composed of five bits.

The information coded in the aforementioned manner is enciphered at the transmitter end in the mixing stage (not shown) in conventional manner. The enciphered information, depicted in FIG. 1 by the train of information pulses 1, is inserted with the frequency $f_o$ into a shift register 2. The information stored in the shift register 2 is delivered to one input A of a changeover switch 3 with a clock frequency $f_1$ which is higher than the frequency $f_o$. A counter 4 is coupled with this switch 3.

The input B of the switch 3 has delivered thereto at the frequency $f_1$ auxiliary pulses generated by an auxiliary pulse generator 5 which, in the embodiment under discussion, is constituted by a reinjected shift register. The feedback occurs by means of an Exclusive-Or-circuit 6. The auxiliary pulses are of the same type as the information pulses 1, so that these auxiliary pulses can be transmitted in the same manner as the information pulses. However, in contrast to the information pulses the auxiliary pulses are formed according to a certain principle or law.

The mode of operation of the auxiliary pulse generator 5 will be explained more fully based upon referring to FIG. 5.

The counter 4 causes changeover switch 3 to connect its input A with its output C during five clock steps and then to connect its input B with its output C during the next three clock steps. The output C of the switch 3 is connected with a shift register 7 in which receives the information and auxiliary pulses at the frequency $f_1$. The information stored in the shift register 7 is recalled in the form of an endless pulse train 8 and transmitted in any desirable manner to the receiving station. If desired possible to remove the pulse series 8 directly at the output C of the reversing switch or switching device 3.

In FIG. 3 there is schematically illustrated the generation of the information pulse train 8 by the circuitry of FIG. 1. Between successive groups of five information pulses 1 there is inserted a group of three auxiliary pulses 9 which, as described, occurs by means of the switch 3 of FIG. 1.

In FIG. 4 there is illustrated a stepping mechanism which functionally corresponds to the switch 3 including the counter 4 of FIG. 1.

The coil 10b of an electromagnet 10 is connected at one end at the terminal "0" of a not particularly illustrated voltage source. The other end of the coil 10b is connected via a resistor 11 with the contact 12a of a switch 12, the other contact 12b of which is connected to the positive terminal "+" of the voltage source. A capacitor 13 is connected in parallel with the coil 10b of the electromagnet 10.

The armature 10a of the electromagnet 10 is constructed as stepping or feed pawl for a ratchet wheel 14 or equivalent structure. The armature 10a is rotatably mounted on a pivot 15 and cooperates by means of its one end 10c with the contact 12b of the switch 12. When the magnet 10 is not energized the armature 10a is rocked by a tension spring 16 into the position illustrated in FIG. 4 where it is out of engagement with the teeth 14a of the ratchet wheel 14 and holds closed the contact 12. A blocking pawl 17 is drawn by means of a spring 17a or equivalent structure into the gaps between neighboring teeth 14a in order to prevent any return rotation of the ratchet wheel 14.

A shift 18 connected with the ratchet wheel 14 carries at its other end a contact arm 19 cooperating with contacts 20 arranged in a circular configuration. The contact arm 19 is connected via a sliding contact 21 with the terminal C which corresponds to the output C of the reversing switch or switching device 3 of FIG. 1.

The number of contacts 20 corresponds to the sum of pulses per information pulse group and the number of pulses per auxiliary pulse group, i.e. with the embodiment under discussion there are present 5 + 3 = 8 contacts 20. Five neighboring contacts 20 are connected together and coupled with a terminal A corresponding to the input A of the switch 3 of FIG. 1. The remaining three contacts 20 are all connected with a terminal B which corresponds to the input B of the switch 3 of FIG. 1.

With the magnet 10 de-engerized the armature 10a assumes the position illustrated in FIG. 4 and the switch 12 is closed. Upon applying a voltage to the terminals "0" and "+" the coil 10b of the magnet 10 is energized. Since the capacitor 13 first must be charged the attraction of the armature 10a occurs with a time-delay. Due to the attraction of the armature 10a the ratchet wheel 14 is rotated in clockwise direction through one tooth division and the blocking pawl 17 prevents a return rotation. Together with the rotation of the ratchet wheel 14 the contact arm 19 is also rotated to the next successive contact 20.

Due to the attraction of the armature 10a the contact 12b is raised and the switch 12 opened, with the result that the excitation coil of the magnet 10 is disconnected from the voltage source. After discharge of the capacitor 13 the armature 10a drops under the action of the spring 16 and the switch 12 is again closed and there occurs in the described manner a further switching step.

If there is conceptually considered that the terminal A is connected to the shift register 2 and the terminal B to the shift register 5 of FIG. 1, then it will be seen that the terminal C is connected each time through five clock steps with the shift register 2 and during the following three clock steps with the shift register 5.

Referring to FIG. 5 there will be explained in greater detail the mode of operation of the reinjected shift register 5 of FIG. 1. With the present exemplary embodiment the shift register 5 is a three stage register. The feedback logic circuit comprises an Exclusive-Or-gate 6, the inputs 6a and 6b of which are connected with the first and third stages of the shift register 5 and the output 6c of which is connected with the first stage of such shift register. The information inserted in each instance during each clock pulse in the first shift register stage I is formed from the information previously stored in the first and third stages I, III, and specifically according to the following truth table:

L \ 0   L

0 \ L   L

L \ L   0

0 \ 0   0

In FIG. 5 there are illustrated the successive states of the shift register 5, wherein in order to differentiate between the information bits and the auxiliary bits the latter are characterized by "A" and "B," wherein "A" = "L" and "B" = "0."

In position 1 there is illustrated a random condition or state of the shift register 5. Position 1a illustrates the intermediate state after a shift step towards the right without refilling the first stage. Position 2 illustrates the state after a first complete clock step. In position 3 to 7 there are illustrated the successive states of the shift register 5. In positions 8 there is again reached the state according to position 1. After seven steps there has been reached, apart from the state "B," "B," "B" which would not lead to any new state according to the operational principle, each of the possible states at least once.

There has been described above how there is produced at the transmitter end a pulse train which consists of information pulse groups and between such the inserted auxiliary pulse groups.

At the receiver end of the system there exists the problem of separating the auxiliary pulses from the information pulses of the incoming pulse train. Without the provision of special measures it would not be possible to distinguish between the information pulses and the auxiliary pulses since they are both electrically of the same nature.

Figure 2:
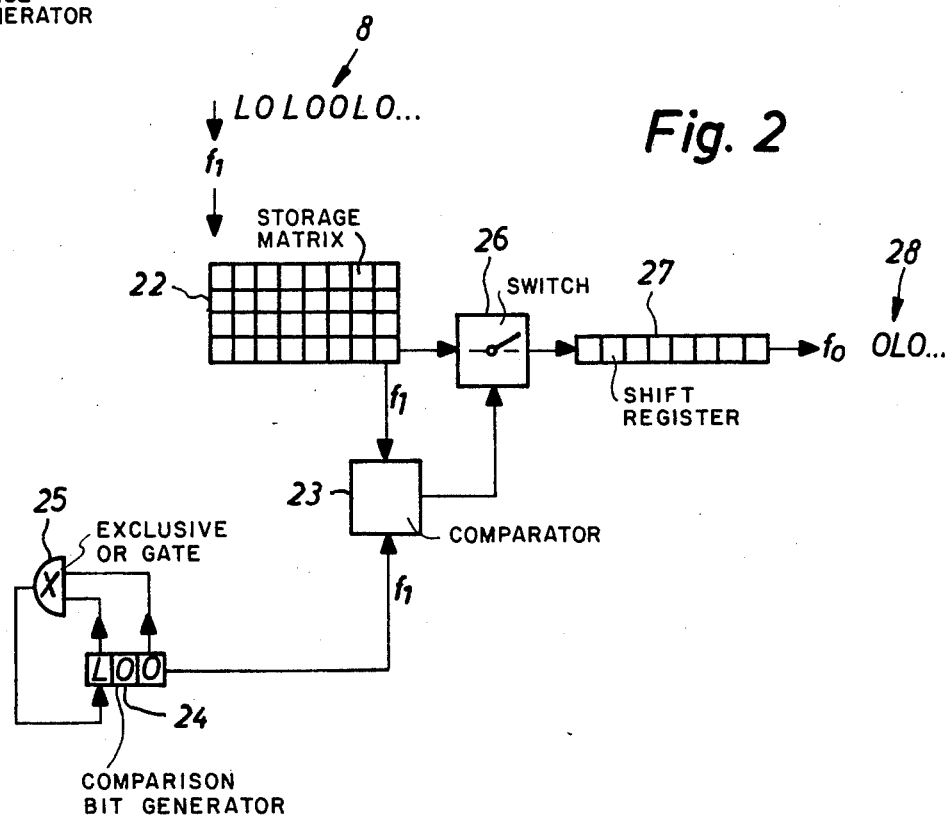
FIG. 2 is a block diagram of circuitry at the receiver end.

In FIG. 2 there is illustrated circuitry at the receiver end which in a manner to be discussed more fully hereinafter is capable of separating the information pulses from the auxiliary pulses. This circuitry comprises a storage matrix 22 which, in the embodiment being considered, will be seen to possess four lines and eight columns.

The pulse train 8 arriving from the transmitter station is stored with the frequency $f_1$ in this storage matrix 22. Reference character 23 designates a comparison stage or comparator which is coupled with a comparison bit generator 24 serving for producing comparison bit groups and which in the case under discussion is a reinjected shift register. The feedback occurs with the aid of an Exclusive-Or-gate 25. The shift register 24 together with the feedback logic circuit 25 corresponds both in construction and mode of operation to the reinjected shift register 5 of FIGS. 1 and 5.

Connected with the output of the storage matrix 22 is a switch 26 which is opened and closed by the comparison stage 23 in a manner still to be described. Further, switch 26 is connected to a shift register 27.

In order to explain the operation of the circuit of FIG. 2 reference will be initially made to FIGS. 6 and 7.

In FIG. 6 there is illustrated the storage of the arriving or incoming information pulses in the storage matrix 22. As already explained in conjunction with FIG. 5 for permitting better distinguishment between the information pulses and the auxiliary pulses the auxiliary pulses have been designated by "A" and "B" and the information pulses by "L" and "0." Mention is again made of the fact that such distinguishment is not present in reality since the auxiliary pulses and information pulses are of the same type.

As indicated in FIG. 6a with the arrow A the storage occurs in the first line. In FIG. 6a there have been stored both of the first bits "0" and "L" of the information pulse group. In FIG. 6b there have been stored nine bits i.e., five information bits, three auxiliary bits and a further information bit. Both of the bits shown in FIG. 6a are now located in line 2, column 1 and line 1, column 8. FIGS. 6c and 6d illustrate the state of the storage matrix 22 after there has occurred the further storage of bits. FIG. 6d illustrates the storage matrix 22 in an almost filled condition or state. Both of the bits which have been stored and illustrated in FIG. 6a are now located in line 4, columns 6 and 7.

It is still to be remembered that for the logic operations "A" is to be regarded as "L" and "B" as "0." The discrimination is only made in this example to explicitly show up the basic principle.

FIG. 6e illustrates the condition or state which results from FIG. 6d five clock pulses later. The first stored bits (FIG. 6a) have now disappeared. FIGS. 6f, 6g and 6h illustrate the relevant states after a further three, further seven and further two clock pulses, respectively.

From the showing of FIG. 6 it will be now recognized that the stored auxiliary bits "A," "B" always appear in columns. These columns can be located adjacent one another (FIGS. 6e and 6h), or however can be the first two and the last columns (FIGS. 6d and 6f), or the first and both of the last columns (FIG. 6g).

In FIG. 7 there are illustrated the states of the shift register 24 (FIGS. 2 and 5) arranged in lines in columns, wherein the content of each line is shifted by one step relative to the content of the line situated thereabove. Thus, for instance, the bit group of line 1, column I, is located in line 2 of column II, in line 3 in column III and in line 4 in column IV. The first line of the illustration of FIG. 7 corresponds to the illustration of the state of the shift register 5 and 24 respectively, selected in FIG. 5.

Now if the columns of FIG. 7 are compared with two or three adjacently situated columns of the storage matrix 22 of FIG. 6, then there will be ascertained a coincidence between the "A," "B"-illustration of FIGS. 6 and 7. Thus, for instance, the information stored in the columns 5 to 7 of the storage matrix 22 of FIG. 6e corresponds to the illustration of column 1 of FIG. 7, the information stored in both last columns of FIG. 6g corresponds to both first rows of column II of FIG. 7, and the information stored in columns 1 – 3 of FIG. 6h corresponds to column III of FIG. 7.

It is apparent that by comparison of the information in two or three adjacent columns of the storage matrix 22 with the comparison bit groups. (FIG. 7) produced by the shift register 24 (FIG. 2) there can be determined the position of the auxiliary bit group in the pulse train 8 arriving from the transmitter and stored in the storage matrix 22, since the auxiliary bit group at the transmitter end and the comparison bit group at the receiver end have been formed according to the same operational principle or law.

Even if, and as such is the case in reality, there does not exist any difference between the nature of the information bits and the auxiliary bits or comparison bits, respectively, i.e. if in the FIGS. the "A"/"B"-illustration is replaced by an "L"/"O"-illustration, there is present the described comparison possibility. Since the auxiliary bit group and the comparison bit group, in contrast to the information bit group, are formed according to a given law or principle, there automatically occurs during a column-like comparison of the information stored in the storage matrix with the comparison bit group of shift register 24 a coincidence between the auxiliary bit group stored in the storage matrix and the comparison bits produced by the shift register 24.

The above-described comparison of the information stored in the columns of the storage matrix 22 with the comparison bits which are produced by the shift register 24 is carried out by the comparison stage 23 (FIG. 2). As soon as the comparison stage 23 has determined by comparison the position of the auxiliary bit group in the received pulse train and the bit group stored in the storage matrix 22, then each time for five clock steps it closes the switch 26 and again opens the same for the next following three clock steps. As a result during the five clock steps, when the switch 26 is closed, the output of the storage matrix 22 is connected with the input of the shift register 27. The information bits stored in the storage matrix 22 are thus stored in the shift register 27, whereas the auxiliary bits are separated out during the three clock steps during which the switch 26 is opened.

The information bits are then removed and further processed i.e., deciphered as continuous information pulse train 28 from the shift register 27. Apart from transmission errors, this information pulse train 28 corresponds to the information pulse train 1 at the transmitter end (FIG. 1).

The aforexplained comparison occurs at an extremely high speed until there has been determined in the described manner the position of the auxiliary pulse group. From this moment on the transmitter and receiver have been brought into synchronism and the receiver operates in step with the received pulse train. The auxiliary pulse group arriving from this point onward in time, only serve as confirmation of the synchronization of the transmitter and receiver.

If the auxiliary pulses are changed by transmission faults or defects, then there is rendered somewhat difficult the location of the auxiliary pulse groups at the receiver end since no longer all of the pulses of the auxiliary pulse groups represent the state required according to the information principle. It is however still possible to determine the correct position of the auxiliary pulse groups. With the transmitter and receiver placed into the same position i.e. synchronized, transmission defects hardly have a distrubing effect since for the confirmation of the proper operation there are required only a few correct auxiliary pulses.

If the receiver has moved out of step during the information transmission, for instance owing to a disturbance lasting over a longer period of time, for instance a breakdown and so forth, then, the receiver again will synchronize-in at the transmitter end in the previously described manner as soon as there are received in the shift register a sufficient number of correct auxiliary pulse groups.

It should be apparent that the number of both the information pulses per information pulse group as well as also the auxiliary pulses and the comparison pulses, respectively, per auxiliary pulse group and comparison pulse group, respectively, can be optionally selected. It is only important that the auxiliary pulses are introduced in a fixed and constant spacing between the information pulses and that each auxiliary pulse groups and comparison pulse groups respectively, is produced according to a given or predetermined formation principle or law from the preceding auxiliary pulse group and comparison pulse group, respectively. Depending upon the number of pulses per information pulse group and auxiliary pulse group the components of the circuitry of FIGS. 1 and 2 are to be appropriately differently designed than illustrated.

This formation principle in effect can be of a random nature. However, the formation of the auxiliary pulse group and the comparison pulse group by means of feedback shift registers is particularly suitable.

The auxiliary pulses separated out at the receiver end by means of the circuitry of FIG. 2 can be utilized for the synchronization of the Key Generators of the receiving station and the transmitting station. Each auxiliary pulse group is then characteristic for the momentary condition or state of the Key Generator. The synchronization of the Key Generators in this manner constitutes subject matter of the commonly assigned copending U.S. application Ser. No. 653,757filed Jan. 27, 1976 entitled "Method And Apparatus For Synchronizing A Receiver End Key Character Generator With A Transmitter End Key Character Generator", the disclosure of which is incorporated herein by reference.

While there is shown and described present preferred embodiments of the invention, it is to be distinctly understood that the invention is not limited thereto, but may be otherwise variously embodied and practiced within the scope of the following claims.

What is claimed is:

1. A method for the synchronization of a deciphering device operating as a receiver with an enciphering device operating as a transmitter, comprising the steps of:
   (1) forming groups of information pulses;
   (2) forming a plurality of different auxiliary pulse groups, each said auxiliary pulse group comprising a predetermined number of auxiliary pulses;
   (3) inserting at the transmitter one of said auxiliary pulse groups between successive information pulse groups, each of said auxiliary pulse groups inserted between successive information pulse groups being formed as a function of the last inserted auxiliary pulse group according to a predetermined formation principle, said step of inserting one of said auxiliary pulse groups between successive information pulse groups comprising the steps of:
   (a) storing said information pulses in a shift register at said transmitter;
   (b) applying both said information pulses stored in said shift register and said auxiliary pulses to a switching device;
   (c) applying a number of information pulses equal to one said information pulse group to an output terminal of said switching device and thereafter applying a number of auxiliary pulses equal to one said auxiliary pulse group to said output of said switching device;

(4) transmitting said information and inserted auxiliary pulse groups from said transmitter to said receiver;
(5) storing in a storage means located at said receiver said auxiliary and said information pulse groups transmitted by said transmitter, said storage means comprising a storage matrix;
(6) forming a plurality of different comparison pulse groups at said receiver, said comparison pulse groups having the same number of pulses and formed according to the same formation principle as said auxiliary pulse groups;
(7) comparing a plurality of different said comparison pulse groups with said stored pulse groups to determine the position of said auxiliary pulse groups in said storage means, said step of comparing a plurality of comparison pulse groups with said storage pulse groups including the step of comparing said pulses stored in said storage matrix column for column with said comparison pulse groups to determine the location of said auxiliary pulse groups in said storage matrix;
(8) separating said auxiliary pulse groups from said information pulse groups stored in said storage means.

2. The method of claim 1 wherein said step of separating said auxiliary and information pulse groups includes the step of removing said information pulses from said storage matrix and storing said removed information pulses in a storage register.

3. Apparatus for the synchronization of a deciphering device functioning as a receiver with an enciphering device functioning as a transmitter, comprising:
(1) a switching means located at said transmitter and including a first and a second input and an output terminal;
(2) means for supplying information pulses to said first input of said switching means;
(3) auxiliary pulse generator means for generating a plurality of different auxiliary pulse groups, each said auxiliary pulse group comprising a predetermined number of auxiliary pulses and each consecutive auxiliary pulse group being generated as a function of the last generated auxiliary pulse group according to a predetermined formation principle;
(4) means for applying said auxiliary pulses to said second input of said switching means;
(5) said switching means having its output connected to said first input terminal for a first predetermined number of clock intervals corresponding to the number of information pulses in an information pulse group and thereafter having its output connected to said second input terminal for a second predetermined number of clock intervals corresponding to a number of auxiliary pulses in an auxiliary pulse group, whereby one of said auxiliary pulse groups is inserted between each successive group of information pulses;
(6) means for transmitting said information and said inserted auxiliary pulse groups from said transmitter to said receiver;
(7) storage means located at said receiver for storing said auxiliary and information pulse groups transmitted by said transmitting means;
(8) a comparison pulse generator means for generating a plurality of different comparison pulse groups at said receiver, said comparison pulse groups having the same number of pulses and formed according to the said formation principle as said auxiliary pulse groups;
(9) means for comparing a plurality of said comparison pulse groups with said stored pulse groups to determine the position of said auxiliary pulse groups in said storage means;
(10) means responsive to said comparing means for separating the auxiliary pulses from the information pulses after said comparing means has determined the position of said auxiliary pulse groups in said storage means;
(11) said auxiliary pulse generator means and said comparison pulse generator means each comprising a reinjected shift register provided with a feedback means, each auxiliary pulse group and each comparison pulse group being defined by one state of its respective shift register.

4. The apparatus as defined in claim 3, wherein the feedback means of each shift register comprises an Exclusive-Or-circuit.

5. The apparatus as defined in claim 3, wherein said means for supplying information pulses comprises a shift register connected to said first input of said switching means.

6. The apparatus as defined in claim 5, further including a shift register for storing said information pulse groups and said auxiliary pulse groups, said shift register being connected with said output of said switching means.

7. The apparatus as defined in claim 3, further includings a shift register for storing said information pulse groups separated from said auxiliary pulse groups of said means responsive to said comparing means.

* * * * *